(12) United States Patent
Doutre et al.

(10) Patent No.: US 9,148,645 B2
(45) Date of Patent: Sep. 29, 2015

(54) CROSSTALK CANCELLATION IN 3D DISPLAYS

(75) Inventors: Colin R. Doutre, Vancouver (CA); Panos Nasiopoulos, Vancouver (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 662 days.

(21) Appl. No.: 13/461,723

(22) Filed: May 1, 2012

(65) Prior Publication Data

US 2012/0287250 A1    Nov. 15, 2012

Related U.S. Application Data

(60) Provisional application No. 61/486,268, filed on May 14, 2011.

(51) Int. Cl.
*H04N 13/04* (2006.01)
*H04N 13/00* (2006.01)

(52) U.S. Cl.
CPC ...... *H04N 13/0018* (2013.01); *H04N 2213/002* (2013.01)

(58) Field of Classification Search
USPC .......................................................... 348/51
See application file for complete search history.

(56) References Cited

U.S. PATENT DOCUMENTS

| 6,532,008 B1 | 3/2003 | Guralnick |
| 7,233,347 B2 | 6/2007 | Jones et al. |
| 7,505,061 B2 | 3/2009 | Jones et al. |
| 2006/0268104 A1* | 11/2006 | Cowan et al. ................. 348/42 |
| 2008/0036696 A1 | 2/2008 | Slavenburg et al. |
| 2008/0117231 A1* | 5/2008 | Kimpe ......................... 345/629 |
| 2009/0244266 A1 | 10/2009 | Brigham |
| 2011/0032340 A1 | 2/2011 | Redmann et al. |
| 2011/0080401 A1 | 4/2011 | Tan et al. |
| 2011/0134229 A1* | 6/2011 | Matsumoto et al. ........... 348/56 |

(Continued)

FOREIGN PATENT DOCUMENTS

| CN | 1745589 A | 3/2006 |
| CN | 101123736 A | 2/2008 |

(Continued)

OTHER PUBLICATIONS

Doutre et al., "Crosstalk Cancellation in 3D Video With Local Contrast Reduction", European Signal Processing conference, Aug. 29-Sep. 2, 2011.*

(Continued)

*Primary Examiner* — Dave Czekaj
*Assistant Examiner* — Mohammad J Rahman

(57) ABSTRACT

Image processing is performed to facilitate subtractive crosstalk cancellation in 3D images. In a global embodiment, pixel values are compressed to provide sufficient foot room for subtractive crosstalk cancellation. For video images the degree of compression may vary from frame to frame. Temporal filtering may be applied to reduce flicker. In a local embodiment luminance is added to and/or compression is performed in local areas to facilitate more complete subtractive crosstalk cancellation. The amount or added luminance or compression may be matched to the requirements of the local areas. Added luminance and/or compression may be made to vary smoothly in time and smoothly in space. Displays and other apparatus may be constructed to perform methods for partial or complete crosstalk cancellation.

26 Claims, 7 Drawing Sheets

(56) References Cited

U.S. PATENT DOCUMENTS

2012/0057780 A1* 3/2012 Matsumoto .................. 382/154
2013/0249904 A1* 9/2013 Kobayashi et al. ........... 345/419

FOREIGN PATENT DOCUMENTS

| CN | 101331776 A | 12/2008 |
| CN | 101946520 A | 1/2011 |
| EP | 1460611 A1 | 9/2004 |
| GB | 316605 | 5/1930 |
| JP | 07154827 A | 6/1995 |
| JP | 2001-298754 A | 10/2001 |
| WO | 2010107227 A2 | 9/2010 |
| WO | 2011016845 A1 | 2/2011 |

OTHER PUBLICATIONS

Haralick, R.M., et al. "Computer and Robot Vision, vol. 1". Addison-Wesley, 1992, pp. 40-49.

Konrad, J., et al., "Cancellation of image crosstalk in time-sequential displays of stereoscopic video", IEEE Transactions on Image Processing, vol. 9, No. 5, pp. 897-908, May 2000.

Barkowsky, M. et al., "Crosstalk measurement and mitigation for autostereoscopic displays", Three-Dimensional Image Processing (3DIP) and Applications, ed. Atilla M. Baskurt, SPIE-IS&T, vol. 7526, 2010.

Lipscomb, James S. et al., "Reducing crosstalk between stereoscopic views", Proc. SPIE 2177, 92, pp. 92-96, 1994.

Doutre, C. et al., "Optimized contrast reduction for crosstalk cancellation in 3D displays", IEEE, 2011.

* cited by examiner

CROSSTALK CANCELLATION IN 3D DISPLAYS

CROSS REFERENCE TO RELATED APPLICATIONS

This application claims priority from U.S. Patent Application No. 61/486,268 filed on 14 May 2011 and entitled CROSSTALK CANCELLATION IN 3D DISPLAYS, which is incorporated herein by reference. For the purposes of the United States, this application claims the benefit under 35 U.S.C. §119 of U.S. Patent Application No. 61/486,268 filed on 14 May 2011 and entitled CROSSTALK CANCELLATION IN 3D DISPLAYS.

TECHNICAL FIELD

This invention relates to 3D displays. The invention relates particularly to mechanisms for cancelling crosstalk in 3D displays.

BACKGROUND

There are various technologies available for displaying 3D images to viewers. These technologies present separate images to viewers' left and right eyes. The images may present different perspectives of the same scene or object. The viewer's brain combines and interprets the left and right eye images to perceive a single 3D image having the illusion of depth.

Some non-limiting example technologies used in 3D displays include:
- polarizing the left- and right-eye images differently. Viewers can wear polarizing glasses to block viewing of the left-eye image by the right eye and to block viewing of the right-eye image by the left eye;
- displaying left- and right eye images in an alternating sequence. Viewers may view the images through glasses incorporating controlled shutters that open and close in time with the display of the images;
- technologies which provide left- and right-eye images having different spectral characteristics. Viewers may view the images through glasses incorporating spectral filters which pass one image but block the other;
- multiview technologies that direct different images to different positions in space (so that viewers' eyes see different images.

One problem with 3D imaging displays is that there can be crosstalk between the images viewed by viewers' left and right eyes. These images may be called 'views'. "Crosstalk" is the condition where light intended to be viewed only by one eye of a viewer is also visible to some degree to the viewer's other eye. Crosstalk can occur due to any of a wide variety of reasons. For example, shutters, polarizers or filters worn over each of a viewers' eyes may not completely block from reaching one eye light from the image that is intended to be viewed only by the other eye and vice versa.

Crosstalk can cause viewers to perceive "ghosting" in the 3D image, an effect where a double image is seen, particularly at high contrast edges in the image. Crosstalk can greatly reduce the perceived 3D image quality, and in can inhibit viewers from fusing the image and perceiving depth.

Crosstalk can be particularly noticeable in cases where pixels in a left-eye image are very bright and corresponding pixels in the corresponding right-eye image are very dark or vice versa.

There remains a need for effective and practical ways to cancel crosstalk in 3D displays.

SUMMARY

This summary is provided to introduce a selection of representative concepts and aspects of the invention in a simplified form that are further described below in the description. This summary is not intended to identify key features or essential features of the claimed subject matter, nor is it intended to be used in any way that would limit the scope of the claimed subject matter.

The invention provides methods and apparatus relating to processing and displaying 3D images. One aspect relates to cancellation of crosstalk in 3D images. The invention may be embodied in methods and in apparatus. The apparatus may comprise stand-alone apparatus or may be integrated with a display, or other apparatus in a pipeline for delivery of 3D image data to a display.

One example aspect of the invention provides a method for preparing 3D images comprising left-eye and right-eye views for display. The example method comprises: based on image data determining amounts to increase pixel values to allow complete subtractive crosstalk cancellation; determining a maximum of the amounts; and globally increasing the pixel values by one or both of addition and scaling in an amount based on the maximum. The 3D images may comprise video frames in a video sequence. In some embodiments the method comprises applying a temporal low pass filter to the maximum or an amount derived from or related to the maximum.

Another example aspect provides a method for preparing 3D video images comprising left-eye and right-eye views for each of a series of frames for display. The method comprises: identifying local areas in a view where pixel values are too small to allow complete subtractive crosstalk cancellation; determining intensities for patches of luminance to add to the local areas; temporally low-pass filtering the intensities; and generating the patches of luminance according to the temporally filtered intensities.

In some embodiments the method comprises, for each of the patches of luminance generating a corresponding patch of luminance for the other view. Generating a corresponding patch of luminance may comprise locating a center of the patch of luminance, performing block matching to estimate the disparity between the views at a location corresponding to the center of the local area and adding to the other view a copy of the patch of luminance shifted in the x-direction by the estimated disparity.

Another aspect provides an example method for preparing 3D video images comprising left-eye and right-eye views for each of a series of frames for display. The method comprises: identifying local areas in a view where pixel values are too small to allow complete subtractive crosstalk cancellation; determining intensities for patches of luminance to add to the local areas; linking corresponding local areas across frames of the video images to provide one or more series of linked local areas; identifying a first linked local area of one of the series of corresponding linked local areas; and adding fade-in patches of luminance corresponding to the first linked local area to a series of frames preceding the frame corresponding to the first linked local area.

Other aspects of the invention provide apparatus as described herein. The apparatus may be configured to and/or operable to perform a method according to the invention.

Other aspects of the invention provide computer program products comprising non-transitory media bearing computer-readable instructions which, when executed by one or more data processors, cause the data processors to execute a method according to the invention.

In addition to the exemplary aspects and embodiments described above, further aspects and embodiments will become apparent by reference to the drawings and by study of the following detailed descriptions.

BRIEF DESCRIPTION OF DRAWINGS

The accompanying drawings show non-limiting example embodiments.

Throughout the drawings and description like reference symbols are used to indicate like elements.

DESCRIPTION

Figure 1:
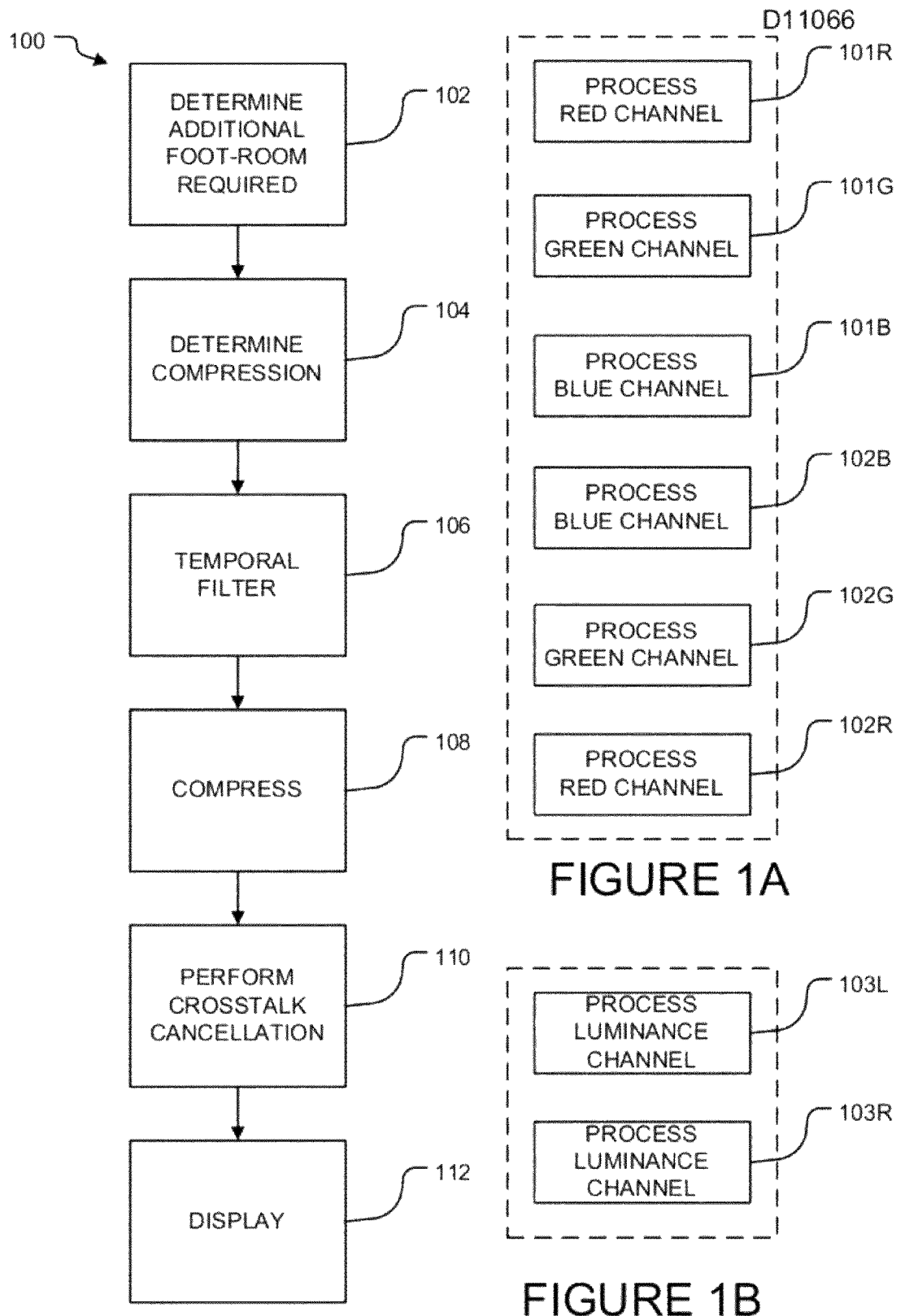
FIG. 1 is a flowchart for a method according to one example embodiment of the invention.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

For example, suppose that a left-eye image has pixel values for some color channel given by $V_L(x,y)$ and the corresponding right-eye image has pixel values for the color channel given by $V_R(x,y)$. Without compensation for crosstalk, a viewer will see in the viewer's left eye an image having pixel values in the color channel of: $V_L(x,y)+A_{RL} \times V_R(x,y)$ and the viewer will see in the viewer's right eye an image having pixel values in the color channel of: $V_R(x,y)+A_{LR} \times V_L(x,y)$. Here $A_{RL}$ is the fraction of light from the right-eye image reaching the viewer's left eye and $A_{LR}$ is the fraction of light from the left-eye image reaching the viewer's right eye. $A_{LR}=A_{RL}$ in many cases.

Crosstalk can be cancelled by processing image data to subtract the estimated crosstalk. For example, the intensity of each pixel may be reduced based on the amount of anticipated crosstalk from the corresponding pixel in the other view. Therefore, as the images are being displayed the crosstalk should be cancelled out, and the viewer should perceive the left and right images as if there were no crosstalk. However, since negative light intensity is not possible, complete subtractive crosstalk cancellation requires pixels in each image to have values larger than the anticipated crosstalk. This may not be the case, especially where pixels in one view are dark and corresponding pixels in the other view are very bright.

Consider the following example where image data comprises 8-bit gamma-encoded red, green and blue values for each pixel. These values can be converted into linear values as follows:

$$I_{lin} = \left(\frac{I_8}{255}\right)^{\gamma} \tag{1}$$

where $I_8$ is the 8-bit gamma encoded input for one color channel (red, green or blue), $\gamma$ is the display gamma (usually 2.2) and $I_{lin}$ is the linear value of that color channel scaled to the range 0 to 1. The views reaching viewers' eyes, each including crosstalk from the other view, can be modeled as:

$$I_{L,eye} = I_{L,lin} + cI_{R,lin} \tag{2}$$

and $$I_{R,eye} = I_{R,lin} + cI_{L,lin} \tag{3}$$

where $I_{L,lin}$ and $I_{R,lin}$ are respectively linear values of the input left and right views $I_{L,eye}$ and $I_{R,eye}$ are respectively the linear values to which the viewer's left and right eyes are exposed and c is the amount of crosstalk.

Subtractive crosstalk cancellation works by modifying the image data for the displayed left and right views such that after the crosstalk is added, the signals reaching the viewer will be the desired images (without crosstalk). This may be done, for example, by processing the image data such that values for the input to the display are given by:

$$I_{L,proc} = \frac{I_{L,lin} - cI_{R,lin}}{1-c^2} \tag{4}$$

and $$I_{R,proc} = \frac{I_{R,lin} - cI_{L,lin}}{1-c^2} \tag{5}$$

where the subscript proc indicates processed input values. By substituting the processed values of Equations (4) and (5) into equations (2) and (3) for $I_{L,lin}$ and $I_{R,lin}$ one can verify that the outputs, $I_{L,eye}$ and $I_{R,eye}$ will be the original images with no crosstalk. Note that applying Equations (4) and (5) basically involves subtracting the right image from the left image and vice versa, with a small gain factor of $1/(1-c^2)$ applied to all terms. Equation (4) or (5) will produce negative results unless both of the following conditions are met:

$$I_{L,lin} \geq cI_{R,lin} \tag{6}$$

and $$I_{R,lin} \geq cI_{L,lin} \tag{7}$$

In some embodiments, light intensity is added to each view in an amount sufficient to permit subtractive cancellation of crosstalk. The cancellation may be complete or partial. The amount of added light intensity may be based on image data such that no more light intensity is added than is required to permit a desired degree of crosstalk cancellation.

In some embodiments processing the image data comprises compressing the image data and/or shifting the image data toward higher intensity such that the black level is raised. The amount that the black level is raised may be computed based on the image data.

In an example embodiment processing comprises applying a function for linearly scaling color channels (e.g. red, green and blue channels) to compress their range to [b,255]. The function may, for example, be given by:

$$I'=b+(1-b/255)I \qquad (8)$$

where I represents a value from any one of the color channels I∈(R, G, B). The same scaling may be applied to every color channel to avoid hue shifts. A larger value of b will compress the dynamic range of the image more, which lowers the image contrast. Therefore, it can be desirable to keep the value of b small while still allowing a desired degree of crosstalk cancellation.

It can be shown that complete crosstalk cancellation is possible where b satisfies:

$$b \geq \frac{c^{\frac{1}{\gamma}}I_C - I_S}{1 + c^{\frac{1}{\gamma}} + (c^{\frac{1}{\gamma}}I_C - I_S)/255} \qquad (9)$$

for the case of 8-bit values where the subscript S indicates the signal image (i.e. the view currently being considered) and the subscript C indicates the crosstalk image (i.e. the view which is the source of crosstalk in the view currently being considered). Equation (9) may be applied to provide a constraint on the value of b for each color channel (e.g. R, G and B) for each pixel in each view.

In an example embodiment, Equation (9) is applied to each color channel for each pixel in each view. The maximum value for b is determined and this value is used in Equation (8) to apply the same image data compression to all color channels to all pixels in both views. This ensures that the conditions of Equations (6) and (7) will hold for all pixels for the processed image data.

In some embodiments a value for b is selected that is somewhat smaller than the value determined by Equation (9). Although this means that complete subtractive crosstalk cancellation is not possible, small amounts of uncancelled crosstalk may not noticeably impact image quality while a reduction in b advantageously reduces the amount of compression.

Processing may be modified to avoid making detailed calculations of b for every color channel of every pixel. For example, it is not necessary to compute b for pixel values that satisfy:

$$I_S \geq c^{1/\gamma}I_C \qquad (10)$$

since, for such pixel values, full compensation for any crosstalk is always possible. In many typical images 90% or more of the pixel values satisfy Equation (10).

Where images comprise video frames, it may be desirable to provide temporal filtering to avoid distracting viewers with sudden changes in compression. This can be straightforward in cases as described above wherein compression is defined by a single parameter such as b. In such cases, b may be low-pass filtered so that b does not undergo sudden changes from frame-to-frame.

In some embodiments the filtering is bi-directional in time so that b begins to increase a few frames in advance of a frame in which b would otherwise have a sudden jump.

In some alternative embodiments, compression using a corresponding value for b may be performed separately for different color channels. However, this can distort colors and is therefore usually undesirable in cases where color fidelity is of concern.

Processing as described above is not limited to the case where pixel values are represented as 8-bit numbers. Pixel values may be represented in any suitable way, for example as 10-bit, 11-bit or 12-bit numbers, numbers in any suitable range, such as 0 to 1 or the like. Furthermore, processing may be performed in a color model other than RGB or other additive color model.

In some embodiments, processing is performed using a color model that provides a pixel value representing light intensity that is separate from pixel values representing hue (or chrominance). One example of such a color model is the YCbCr color model. There are many others such as YUV, xvYCC, YPbPr, YIQ, etc.

Applying scaling to the luma component of the YCbCr color model (or a corresponding component on other similar color models) can be done without altering pixel values which define hue (chromaticity). Consequently, performing processing on image data wherein pixel values are represented in the YCbCr color model (or a similar color model) may provide the advantage of better preservation of color.

In the ITU-R BT.709 standard, which is commonly used for HDTV, the luma (Y) has range 16 to 235. One can compress the luma range by raising the minimum level while keeping the maximum at 235. This can be accomplished, for example, by scaling the luma as follows:

$$Y'=b+(1-b/235)Y \qquad (11)$$

where Y' is the compressed luma and b is a compression parameter. As above, it is advantageous to select a value for b that is as small as possible while still permitting elimination of crosstalk. A set of conditions that guarantees that crosstalk can be fully compensated is:

$$R_S' \geq c^{1/\gamma}R_C'$$

$$G_S' \geq c^{1/\gamma}G_C'$$

$$B_S' \geq c^{1/\gamma}B_C' \qquad (12)$$

In the case where the conversion between an RGB color space and a YCbCr color space are given by:

$$R=1.164(Y-16)+1.793(Cr-128)$$

$$G=1.164(Y-16)-0.213(Cb-128)-0.534(Cr-128)$$

$$B=1.164(Y-16)+2.112(Cb-128) \qquad (13)$$

By scaling the luma according to Equation (11) and applying conditions (12) one can solve for the smallest value for b that will result in conditions (12) being satisfied in all color channels. Where the transformation is represented by (13), it can be shown that this yields the following equation for the red channel.

$$b \geq \frac{1.164\left(c^{\frac{1}{\gamma}}Y_C - Y_S + 16\left(1 - c^{\frac{1}{\gamma}}\right)\right) + 2.115\left(c^{\frac{1}{\gamma}}(Cb_C - 128) - (Cb_S - 128)\right)}{1.164\left(1 + c^{\frac{1}{\gamma}}\frac{Y_C}{235} - \frac{Y_S}{235} - c^{\frac{1}{\gamma}}\right)} \qquad (14)$$

Similarly, the condition for the green channel is given by:

$$b \geq \frac{1.164\left(c^{\frac{1}{\gamma}}Y_C - Y_S + 16\left(1 - c^{\frac{1}{\gamma}}\right)\right) - 0.213\left(c^{\frac{1}{\gamma}}(Cb_C - 128) - (Cb_S - 128)\right) - 0.533\left(c^{\frac{1}{\gamma}}(Cr_C - 128) - (Cr_S - 128)\right)}{1.164\left(1 + c^{\frac{1}{\gamma}}\frac{Y_C}{235} - \frac{Y_S}{235} - c^{\frac{1}{\gamma}}\right)} \quad (15)$$

The condition for the blue channel is given by:

$$b \geq \frac{1.164\left(c^{\frac{1}{\gamma}}Y_C - Y_S + 16\left(1 - c^{\frac{1}{\gamma}}\right)\right) + 1.793c^{\frac{1}{\gamma}}(Cr_C - 128) - (Cr_S - 128)}{1.164\left(1 + c^{\frac{1}{\gamma}}\frac{Y_C}{235} - \frac{Y_S}{235} - c^{\frac{1}{\gamma}}\right)} \quad (16)$$

One can perform computations as shown in Equations (14) to (16) for all pixels for both views to determine a value of b sufficiently large to perform a desired degree of crosstalk reduction. Once b has been determined, the luma channel of both views can be scaled, for example according to Equation (11), converted to RGB space according to Equations (13) and then compensated for crosstalk according to Equations (4) and (5).

In some embodiments, video may be analyzed at source or in another point in a distribution path upstream from a display. The analysis may comprise comparing pixel values in two views both corresponding to the same frame to identify the most restrictive pairs of pixels (e.g. pairs of pixels exhibiting the greatest contrast between the views) for the frame. This analysis does not require knowledge of the crosstalk c which, in general, will depend on the display on which the images will be displayed. The result of the analysis may be distributed with the images (for example as metadata associated with the images). The metadata may be extracted and used in determining appropriate scaling values for display with subtractive crosstalk cancellation. This approach reduces the complexity of computation at the display and may permit image processing and crosstalk cancellation to be performed at a display with simpler hardware than would otherwise be required.

In cases where a display performs image processing (e.g. applying a sharpening filter) prior to display of images as described herein, it is desirable to perform such image processing before image processing to prepare the image for subtractive crosstalk cancellation as described herein.

FIG. 1 illustrates a method 100 according to an example embodiment of the invention. At block 102, method 100 determines the amount of additional foot room needed for subtractive crosstalk cancellation for each pixel in each of left-eye and right-eye views. As shown in FIG. 1A, the required additional foot room may be determined separately for each of a plurality of color channels (as indicated by blocks 101R, 101G and 101B (which process the left-eye view) and blocks 102R, 102G and 102B (which process the right-eye view).

In an alternative embodiment illustrated in FIG. 1B, pixel values are represented in or transformed into a color model having a separate luminance value and the required additional foot room is determined from the luminance values in blocks 103L and 103R which process left- and right-eye views respectively.

In block 104, a value for an amount of compression (e.g. b) or an amount of luminance to add to each color channel or a luminance channel is determined. Block 104 may, for example, be based on a maximum or almost-maximum value of the required additional foot room across color channels for both views, a maximum or almost-maximum value of the required additional foot room across luminance channels for both views. An almost-maximum value is for example a $90^{th}$ percentile, or a $95^{th}$ percentile or a $99^{th}$ percentile value or the like.

In block 106, where the images are video frames, a low-pass temporal filter is applied to the amount of compression or luminance from block 104.

In block 108 the image is compressed (or luminance is added) based on the temporally-filtered amounts from block 106.

In block 110, subtractive crosstalk cancellation is performed.

In block 112 the image is displayed.

Figure 2:
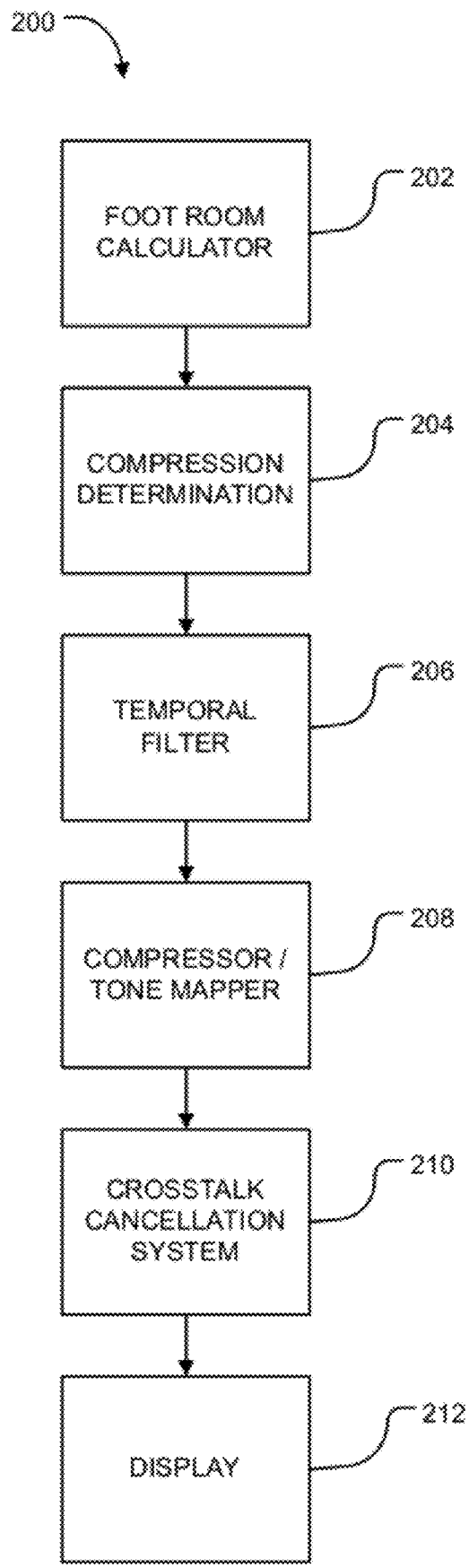
FIG. 2 is a block diagram illustrating apparatus according to an example embodiment of the invention.

FIG. 2 illustrates apparatus 200 according to an example embodiment. Apparatus 200 comprises a calculating block 202 which determines the amount of additional foot room needed for subtractive crosstalk cancellation. Calculating block 202 may have a plurality of parts that operate in parallel on different color channels or luminance channels of left and right views of an image. Calculating block 202 may comprise a programmed data processor, for example one or more microprocessors or graphics processors or digital signal processors, programmable logic circuits such as a FPGA, hard wired logic circuits, combinations thereof or the like.

Compression determining block 204 determines a desired compression from the outputs of block 202. Temporal filter 206 filters the output of block 204. Compressor 208 compresses image data of both views according to the output of temporal filter 206. Block 210 performs subtractive crosstalk cancellation. Block 212 is a display on which the image is displayed.

Example

Methods as described above were applied to three 3D stereo images. A display gamma of 2.2 and 7% crosstalk (c=0.07) were assumed. For comparison, the same images were processed by a worst case RGB domain linear scaling (raising the black level to $255c^{1/\gamma}$=76).

An objective comparison of the results is given in Table 1 which shows the compressed ranges for each image and the chroma difference between the original images and compressed images measured with the CIEDE2000 color difference formula. The CIEDE2000 color difference is a perceptual metric for comparing two colors based on the CIELAB color space. In order to prevent the comparisons from being affected by the increases in brightness resulting from application of the methods, the lightness term (L) in the CIEDE2000 formula was set to zero while retaining the terms relating to chroma and hue. This yielded a metric that measures only changes in color.

Comparing the images showed that worst case RGB scaling gave the images a washed out look. Optimal RGB scaling as described above produces images with better contrast, but still somewhat washed out colors compared to the original images. Scaling in YCbCr space produced images with more saturated colors which much more accurately reflect the color of the input images (as indicated by significantly lower CIEDE2000 chroma difference values).

TABLE I

OBJECTIVE COMPARISON OF PROCESSED IMAGES

| | Compressed Range | | | CIEDE2000 Chroma Difference | | |
|---|---|---|---|---|---|---|
| IMAGE | Worst Case RGB | Optimal RGB | Optimal Y | Worst Case RGB | Optimal RGB | Optimal Y |
| 1 | [76,255] | [63,255] | [82,235] | 2.95 | 2.48 | 0.95 |
| 2 | [76,255] | [49,255] | [68,235] | 2.90 | 1.88 | 0.58 |
| 3 | [76,255] | [73,255] | [84,235] | 2.32 | 2.24 | 0.72 |

Since crosstalk does not create problems in all parts of an image, it is not mandatory that processing to permit subtractive crosstalk cancellation be performed globally. Some embodiments identify areas where crosstalk cancellation is necessary or desirable and perform processing on those local areas to ensure that a desired degree of subtractive crosstalk cancellation is possible within the local areas. The processing may raise luminance levels within the local areas by addition of luminance and/or scaling. The scaling may be performed on a luminance channel or on individual color channels, as described above.

Figure 3:
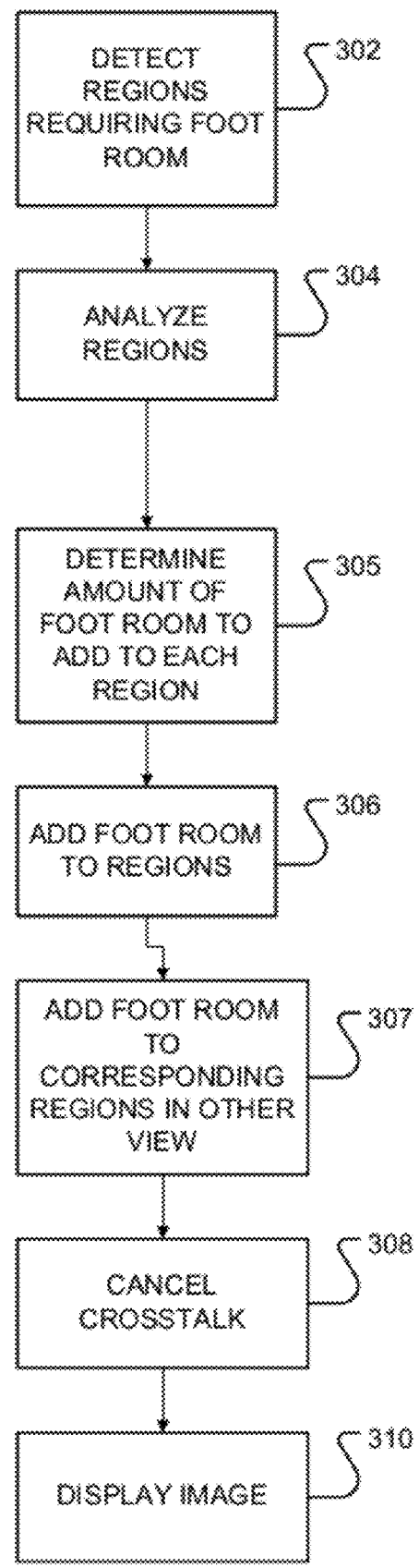
FIG. 3 is a flowchart for a method according to another example embodiment of the invention.

A method 300 according to an example local embodiment is shown in FIG. 3. In method 300 a pair of views for a 3D image are processed in block 302 to detect regions (local areas) where subtractive crosstalk cancellation will fail. Optionally in block 304 the regions are analyzed to determine whether crosstalk cancellation in the region is necessary or desirable according to some criterion. For example, uncancelled crosstalk may not produce noticeable image artifacts in cases where the uncancelled crosstalk is limited to a very small region or occurs only for a very short time (e.g. in the case of a video, only for one frame or only for a few consecutive frames in the video). For regions which are selected by block 304, processing continues at block 305 which determines the amount of foot room to add to each region, block 306 which increases foot room for subtractive crosstalk cancellation by addition of luminance and/or by scaling and block 307 which adds foot room to corresponding regions in the other view. In some embodiments, the amount of added luminance or scaling is determined separately for each region. Regions which are not selected at block 304 may be ignored. Subtractive crosstalk cancellation is performed at block 308 and the image is displayed at block 310.

Advantageously added luminance is made to vary smoothly. For example, in a boundary region surrounding a local area, the added luminance may ramp slowly from zero up to an amount added to the local region. Where an image has multiple local regions to be processed for improving subtractive crosstalk cancellation, different amounts of added luminance and/or scaling may be applied to different ones of the local regions.

Here, i(x, y), represents any one of the red, green and blue color channels of the image. The same signal $\alpha(x, y)$ may be added to all channels in order to avoid altering the pixel colors too much. Separate versions of $\alpha(x, y)$ may be generated for the left-eye and right-eye views respectively. To construct these signals for a local area one can determine how much foot room is required for complete subtractive crosstalk cancellation in the local area and then generate a smooth signal that will raise the luminance sufficiently for effective crosstalk cancellation.

One can identify local regions within which processing to improve crosstalk cancellation may be desirable based on a calculated amount $R_K$ that each pixel in a view has to be raised, in order to provide sufficient foot room for crosstalk cancellation. $R_K$ may be given by:

$$R_K(x,y) = \max(0, c \times I_{C,K}(x,y) - I_{S,K}(x,y)) \quad (18)$$

where the subscript S indicates the 'signal' view being considered, the subscript C indicates the 'crosstalk' view that is the source of crosstalk added to the signal view in displaying the image and the subscript K indicates a color channel (which could, for example, be one of red, green and blue). The result in Equation (18) is clipped to zero by the 'max' function because any negative value indicates the signal view already has sufficient luminance for subtractive crosstalk cancellation.

Identifying local regions may be based on a modified version of $R_K$ in which values less than a threshold are set to zero. The threshold may be based upon a maximum display luminance, for example. In a prototype embodiment, values less than 1% of the maximum display luminance were set to zero.

Small regions, which are less visually noticeable, may be removed, for example, by eroding and dilating $R_K$ with a small mask. For example a circular mask of 8 pixels may be used to remove small regions.

Local areas to be processed to improve crosstalk cancellation may, for example, be identified by dividing $R_K(x,y)$ (as modified by any pre-processing) into a number of connected regions. This may be done, for example, with a binary labeling algorithm. A suitable example binary labeling algorithm is described in R. M. Haralick, and L. G. Shapiro. *Computer and Robot Vision, Volume I.* Addison-Wesley, 1992, pp. 40-48, which is hereby incorporated herein by reference.

Figure 4:
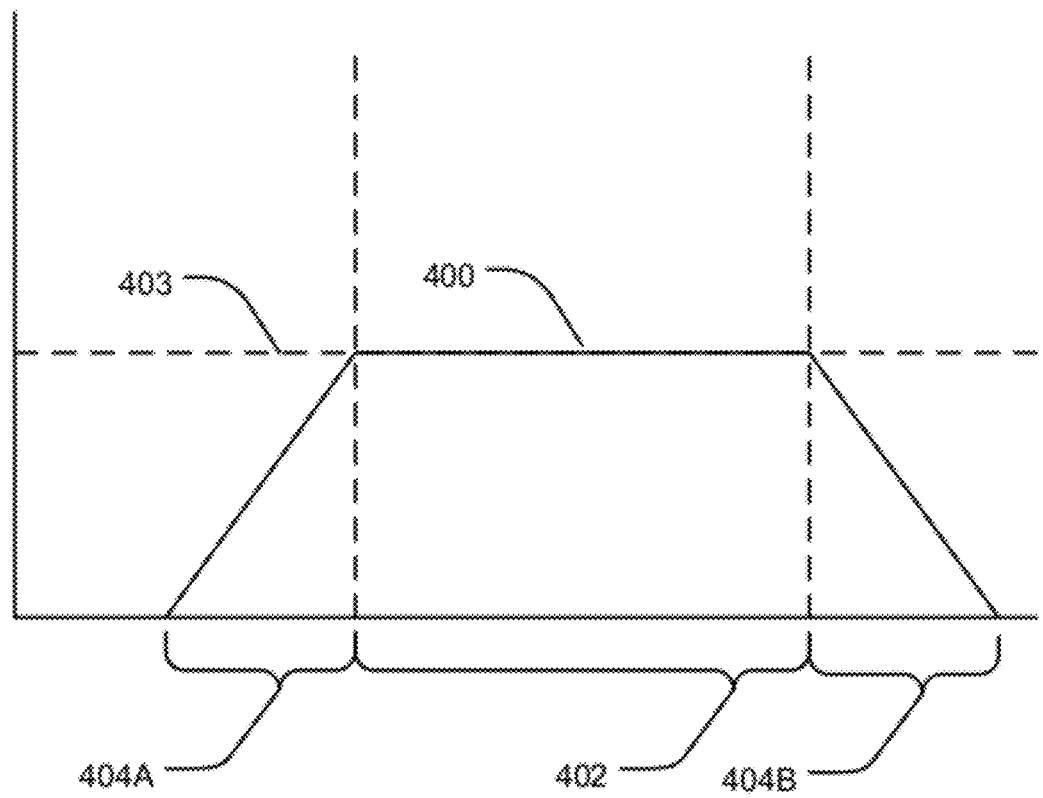
FIG. 4 is a curve illustrating smooth spatial variation of a luminance patch.

For each of these local areas one can add a patch of smoothly varying luminance that has a maximum value for the pixels in the local area and gradually decreases within a region of surrounding pixels based on their distance from the local area. As one example, a patch of luminance to be added for one local area may be calculated as:

$$\alpha_j(x, y) = M_j \times \max\left(0, \frac{w - d(x, y)}{w}\right) \quad (19)$$

where the subscript j is a label for the local area in question, $M_j$ is the maximum value for $R_K$ in local area j, w is the width of a transition region outside of local area j and d is a distance of the pixel at x, y from local area j (d=0 for pixels within local area j). FIG. 4 is a curve 400 of cross section through an example smoothly varying $\alpha(x, y)$ through the center of one local area 402. Within area 402, $\alpha(x, y)$ has a constant value 403. In a boundary or 'transition' region 404 (of which parts 404A and 404B are shown in FIG. 4), $\alpha(x, y)$ smoothly (and in this example, linearly) ramps down from value 403.

For HD resolution videos, an appropriate transition width (w) is 200 pixels. A larger width will result in the transition being less noticeable, but also a larger portion of the image having lower contrast.

Other forms of $\alpha(x, y)$ are also possible. For example, it is not mandatory that $\alpha(x,y)$ decreases linearly with distance from a local area j. Instead, $\alpha(x,y)$ could decrease smoothly according to an alternative function such as a Gaussian or sigmoid function, a polynomial function, a spline curve or the like. It is also not mandatory that $\alpha(x,y)$ has the same value 403 throughout the local area j. Instead, $\alpha(x,y)$ could be gently peaked or vary in some other smooth manner inside local area j.

One can determine $\alpha(x, y)$ based upon the amount $R_K$ that each pixel within a local region has to be raised to provide sufficient foot room for crosstalk cancellation. Equation (18) may be performed for each color channel $\alpha(x, y)$ may be based upon the maximum value of $R_K$ over the local area over all color channels. The same signal $\alpha(x, y)$ may be added to all color channels in the local area. Different amounts of luminance may be added to different local areas.

Where luminance is added to a local area of one view, the same luminance should be added to a corresponding local area of the other view to prevent retinal rivalry. Identifying the corresponding local area in the other view may take into account an estimate of disparity between the views. For example, in one embodiment identifying a corresponding local area in the other view comprises calculating the center-of-mass of the local area determined for one view and then performing block matching to estimate the disparity between views at the center-of-mass of the local area. The block matching may be performed with a relatively large block size (e.g., 16 pixels).

Figure 5A:
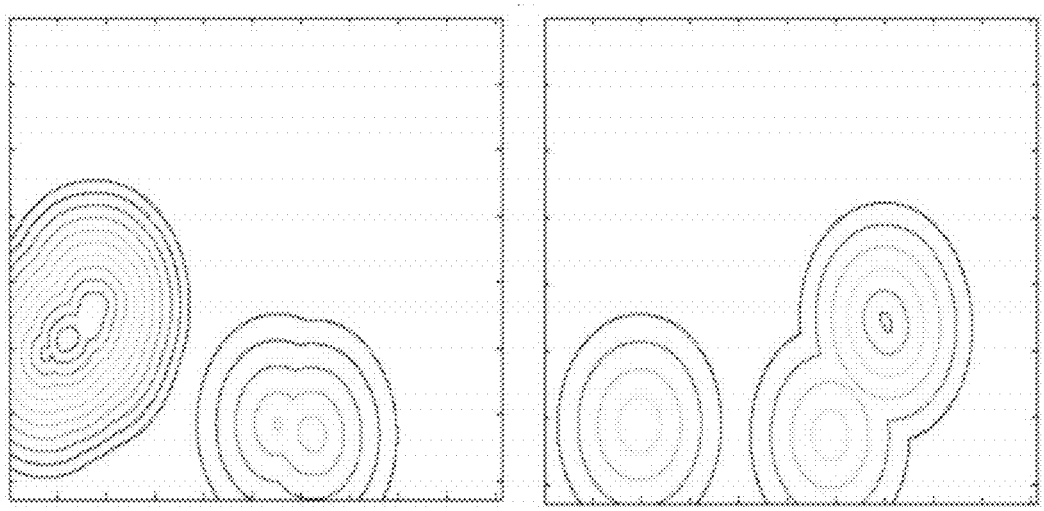
FIGS. 5A, 5B and 5C illustrate the addition of luminance patches in one view corresponding to luminance patches added to increase foot room in the other view.
Figure 5B:
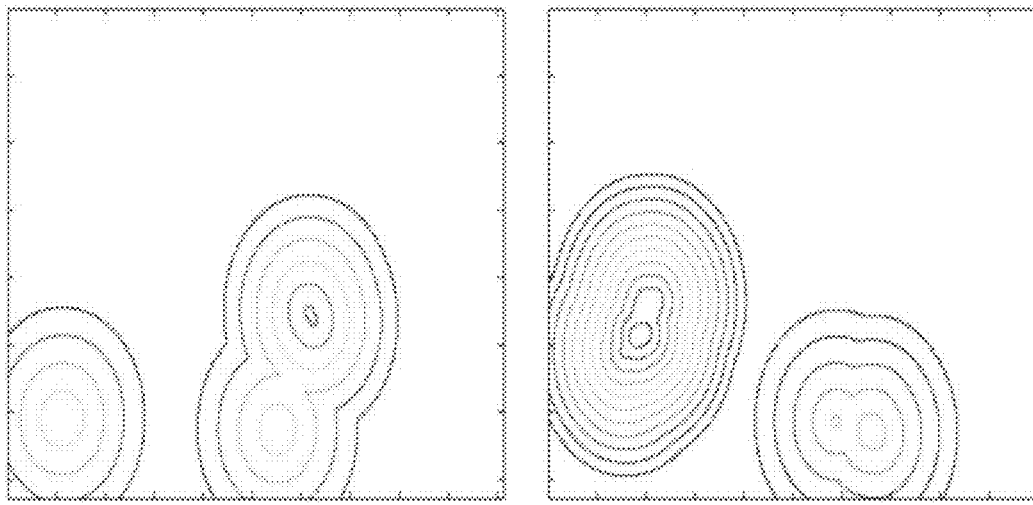

Added illumination for the corresponding local area in the other view may be generated by adding to the other view a copy of $\alpha(x, y)$ shifted in the x-direction by the estimated disparity. FIGS. 5A and 5B illustrate this. In FIG. 5A, patches $\alpha_j(x, y)$ are shown for various local areas in the left and right images. In FIG. 5B additional patches corresponding to patches from the other view and shifted by the estimated disparity are added to each view.

Figure 5C:
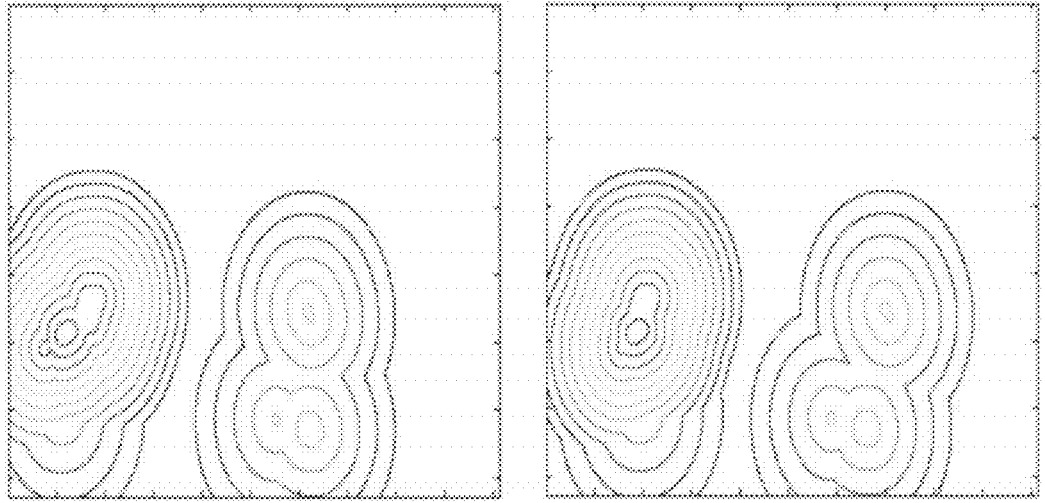

The entire process described here is performed twice, once considering the left view as the signal (S) and the right view as the source of crosstalk (C) and once considering the right image as the signal and the left view as the source of crosstalk (C). In order to generate the final luminance that will be added to each image one can take the maximum of all the individual patches, $\alpha(x, y)$ that cover any pixel (x, y). An example of this is shown in FIG. 5C.

The smooth final luminance signal is added to the input images and subtractive crosstalk cancellation can then be applied (for example as described in relation to Equations (4) and (5). If required or desired, the final images may be converted from the linear space to a gamma encoded space or transformed into a desired image format and/or color model representation.

Where the images are frames in a video sequence then temporal filtering may be performed to reduce flicker resulting from the appearance and disappearance of luminance patches. Further, patches of short temporal duration may optionally be removed. In some embodiments, luminance patches are caused to fade in and fade out gradually. For example, where a luminance patch $\alpha(x, y)$ appears for the first time in a particular video frame then a series of attenuated copies of $\alpha(x, y)$ may be added to a series of video frames immediately preceding the particular video frame. Where a luminance patch $\alpha(x,y)$ appears for the last time in a particular video frame then a series of attenuated copies of $\alpha(x, y)$ may be added to a series of video frames immediately following the particular video frame. The attenuated copies may cause the patch $\alpha(x,y)$ to ramp up linearly or according to some other function.

Figure 6:
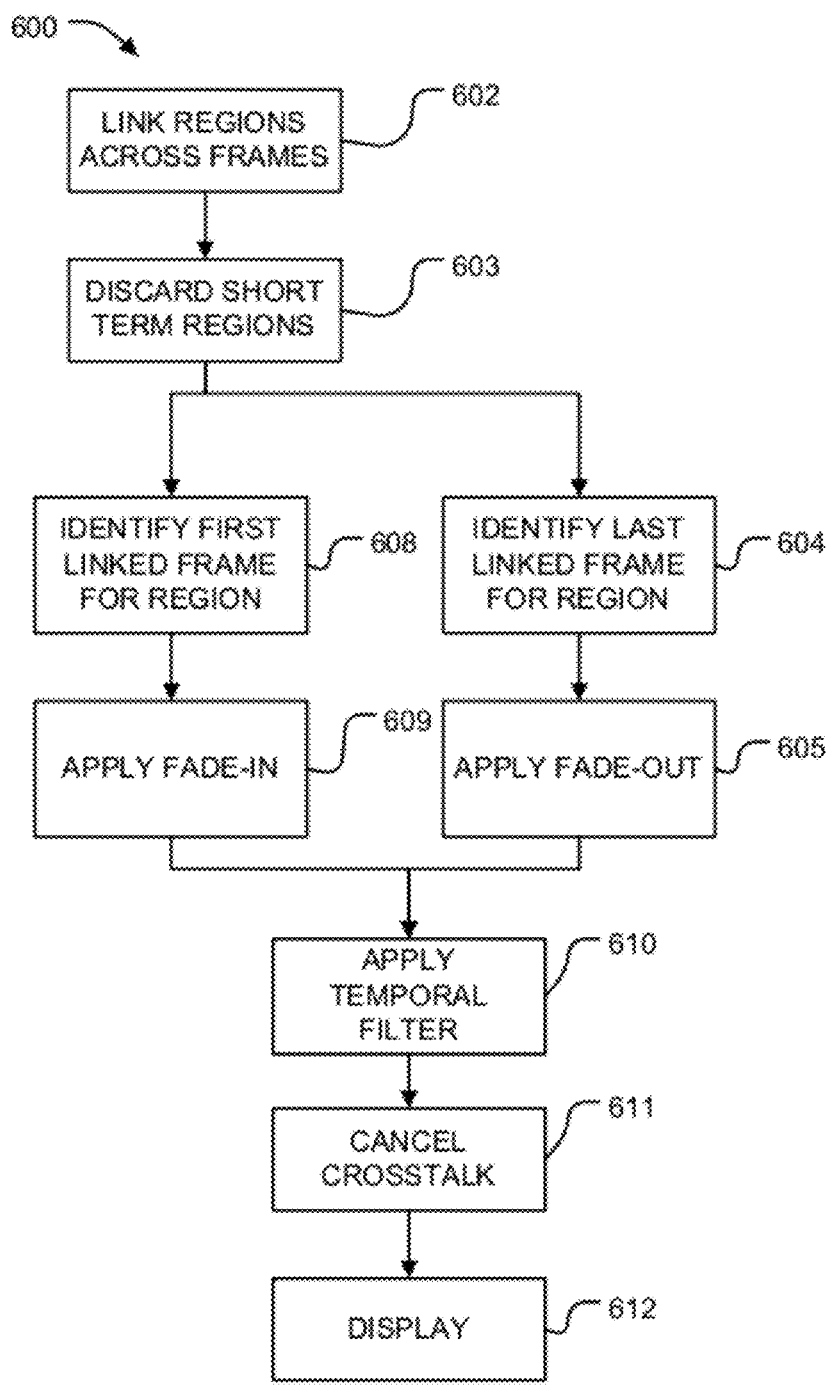
FIG. 6 is a flowchart illustrating an example method for processing image data to add luminance patches that fade in and out for reduced flicker.

A method 600 for processing video data to cause luminance patches to fade in or out is illustrated in FIG. 6. In block 602 regions in temporally adjacent frames are matched. This may be done, for example, by starting at the first frame and progressing through every frame in the video each time matching local areas for which luminance patches are supplied to corresponding local areas in next frame. Matching may comprise, for each local area in frame N comparing a center of mass to the centers of mass of local areas in frame N+1. If the distance between the center of a local area in frame N and the center of a local area in frame N+1 is less than a threshold amount (for example, less than some number of pixels), the local areas are considered a match and 'linked' together. If more than one local area meets the matching criterion then a best matching local area may be linked. The best match may be based upon the center distance and/or the size and shape of the local area. For example, the matching local area with the lowest distance from center to center may be linked.

Linking may be implemented by providing a data structure which identifies local areas in each frame and includes for each frame pointers that point to any matching local areas in the next and previous frames.

In optional block 603 local areas that have a very short temporal durations are discarded. Viewers are not likely to notice crosstalk that appears for a short amount of time. To achieve this, block 603 may the number of frames covered by a linked group of local areas (not counting any copied regions). If the count for a group of temporally linked regions is less than a threshold (e.g. a number of frames corresponding to ½ second or one second worth of frames—such as 30 frames for 30 fps video), then all the local areas in the group may be deleted.

If no match for a local area in frame N is found in frame N+1 then some embodiments make a copy of the local area in frame N+1. In method 600 block 604 performs this function. This copying may serve one or both purposes of allowing the luminance patch for a local area to be faded out, thereby preventing a visually noticeable sudden drop in luminance, and filling in temporal gaps in local areas that are not detected in one or more frames but are detected in later frames. Block 605 applies a fade-out after the last linked region. When copying a luminance patch from frame N into frame N+1, the value for Mj may be decreased by a small amount so that the luminance patch will fade out over time. For example, a prototype embodiment reduced Mj in copies of luminance patches by 0.1% of the display luminance in each frame. This caused typical luminance patches to fade out over 2-3 seconds.

Block 608 identifies local areas that appear for the first time in a frame that is not at the beginning of the video. To prevent a sudden jump in luminance when a local area first appear block 609 applies a fade-in to the luminance patches applied to such local areas. One way to achieve this is to perform a pass through the frames, checking for local areas in frame N that do not have a backward link to a corresponding local area in frame N−1. If any such local areas are found, one can add a copy of the luminance patch into the previous frames, first into frame N−1, then N−2, and so on. Each time a luminance patch is copied, the value for Mj may be decreased by a small amount so that the luminance patch will fade in when the video is played.

As with the fade-out case discussed above. Each copy of the luminance patch may be reduced or attenuated by a small amount such as 0.1% of the display luminance relative to the copy in the next frame to achieve a fade transition time of, for example, a few seconds (e.g. 2-3 seconds in some embodiments).

To prevent flickering, temporal filtering may be applied to ensure that the amounts Mj are consistent between frames and change slowly over time. For example, a low pass filter with cut-off frequency 0.5 Hz may be applied to the added luminance patches to eliminate flicker in video (based on the temporal frequency response of the human visual system). In an example embodiment an 80 tap a low pass filter with cutoff frequency 0.5 Hz, is applied to values of Mj for each region over time. After filtering, a patch of luminance is created for each local area using the temporally-filtered values for $M_j$ in equation (19). In FIG. 6, temporal filtering is performed in block 610.

As described above, corresponding once one or more luminance patches have been established for one view, corresponding luminance patches may be created for addition to the other view. This may be done by performing a disparity search using block matching for each local area and applying a shifted version of the corresponding luminance patch to the other view. To save computation, a smaller disparity search can be used for most frames, using the disparity of the region in the previous frame as the initial estimate (and searching for example +/−2 pixels). The final luminance to add to each view may be obtained by taking the maximum of all patches that cover a pixel. The appropriate final image is then added to each view. Subtractive crosstalk cancellation may then be performed. In FIG. 6, crosstalk cancellation is performed in block 611. The resulting 3D images are displayed in block 612.

Figure 7A:
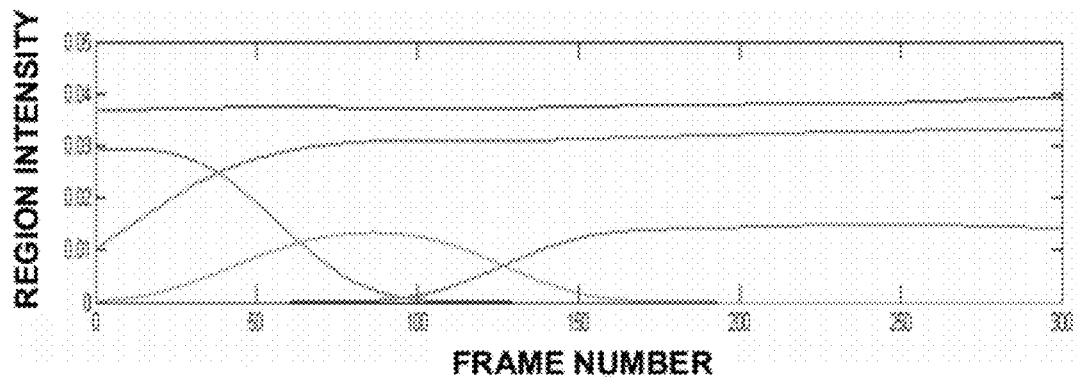
FIGS. 7A and 7B contrast processing for crosstalk cancellation separately for each frame of a video and causing luminance added to aid crosstalk cancellation to fade in and fade out over time.
Figure 7B:
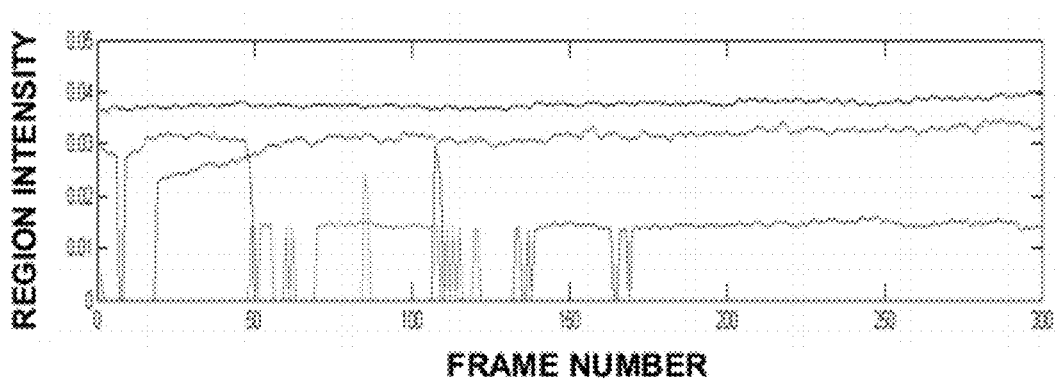

FIG. 7A shows the intensity of the patches added over the course of a 10 second video when using a method as described herein. For comparison, FIG. 7B shows the intensity of patches calculated for each frame independently. As shown in FIG. 7B, patches that are determined for each frame independently can be quite inconsistent from frame to frame. Sometimes a local area for which processing should be applied to facilitate crosstalk cancellation is not detected in every frame. A few local areas are only detected in one or two frames. This results in annoying and highly noticeable flickering in the output video.

By contrast, as shown in FIG. 7A, a method as described herein gives much smoother temporal transitions, and reduces or avoids flickering.

Methods as described herein may be performed in real-time or in a non-real-time preprocessing step. Such methods may be applied, for example, in 3D computer displays, 3D televisions and 3D cinema displays.

In some embodiments which apply processing to signals in real time as the signals are received, when a new local area is detected that was not in the previous frame, a fade-in for the new region is started start at that frame. A relatively fast fade-in may be used since crosstalk may produce visible effects during the fade-in time.

Methods as described herein may be adapted to accommodate crosstalk models other than the linear model exemplified by Equations (2) and (3). To use a different crosstalk model, $R_K$ may be calculated using a function that gives the minimum amount of light required to compensate for the crosstalk from the other view according to the crosstalk model. The crosstalk model may provide non-linear crosstalk, different amounts of crosstalk in different color channels and/or crosstalk that varies spatially, for example.

Apparatus configured to perform methods as described herein may be provided, for example, in a display or a driver for a display; in a computer attached to drive a 3D display, in a video player or media player; in a 3D digital cinema projector or the like. The apparatus may be stand-alone or integrated with a display. In some embodiments, the apparatus is configured to obtain information characterizing crosstalk in a display and to process image data for display on the display based on the information characterizing the display crosstalk. The apparatus may be configured to obtain information characterizing the crosstalk for example from the display itself or from an online database for example.

Systems and modules described herein may comprise software, firmware, hardware, or any combination(s) thereof suitable for the purposes described herein. A system or module may perform one or more function, and one piece of software, firmware or hardware may perform the function(s) of one or more systems or modules. Systems and modules may reside on general purpose computers such as servers, workstations, personal computers, computerized tablets, personal digital assistants (PDAs), and other devices suitable for the purposes described herein. Those skilled in the relevant art will appreciate that aspects of the system can be practiced with other communications, data processing, or computer system configurations, including: Internet appliances, hand-held devices (including PDAs), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," "host," "host system," and the like are generally used interchangeably herein, and refer to any of the above devices and systems, as well as any data processor. Furthermore, aspects of the system can be embodied in a special purpose computer or data processor that is specifically programmed, configured, or constructed to perform one or more of the computer-executable instructions explained in detail herein.

Certain implementations of the invention comprise computer processors which execute software instructions which cause the processors to perform a method of the invention. For example, one or more processors in a computer driving a 3D display, a 3D projector, a 3D display, a graphics card, a source unit connected to drive a 3D projector or display, a set-top box of a cable television system or other data distribution system, or the like may implement methods as described herein by executing software instructions in a program memory accessible to the processor(s). The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Examples of the technology may be stored or distributed on computer readable media, including magnetically or optically readable computer discs, hardwired or preprogrammed chips (e.g., EEPROM semiconductor chips), nanotechnology memory, biological memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Where a component (e.g. an assembly, device, etc.) is referred to above, unless otherwise indicated, reference to that component (including reference to a means) should be interpreted as including as equivalents of that component any component which performs the same function as the described component, including components which are not structurally equivalent to the disclosed structures which perform the function in the illustrated exemplary embodiments of the invention.

Processes, methods, lists and the like are presented in a given order. Alternative examples may be performed in a different order, and some elements may be deleted, moved, added, subdivided, combined, and/or modified to provide alternative or subcombinations. Each of these elements may be implemented in a variety of different ways. Also, while elements are at times shown as being performed in series, they may instead be performed in parallel, or may be performed at different times. Some elements may be of a conditional nature, which is not shown for simplicity.

Unless the context clearly requires otherwise, throughout the description and the claims, the words "comprise," "comprising," and the like are to be construed in an inclusive sense, that is, in the sense of "including, but not limited to." As used herein, the terms "connected," "coupled," or any variant thereof, means any connection or coupling, either direct or indirect, between two or more elements; the coupling or connection between the elements can be physical, logical, or a combination thereof. Additionally, the words "herein," "above," "below," and words of similar import, shall refer to this document as a whole and not to any particular portions. Where the context permits, words using the singular or plural number may also include the plural or singular number respectively. The word "or," in reference to a list of two or more items, covers all of the following interpretations of the word: any of the items in the list, all of the items in the list, and any combination of the items in the list.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for preparing 3D images comprising left-eye and right-eye views for display, the method comprising:
    based on image data determining amounts to increase pixel values to allow complete subtractive crosstalk cancellation;
    determining a maximum of the amounts;
    globally increasing the pixel values by one or both of addition and scaling in an amount based on the maximum
    wherein the 3D images comprise video frames in a video sequence, the method comprises applying a temporal low pass filter to the maximum or an amount derived from the maximum and the temporal filter comprises a bidirectional filter.

2. A method for preparing 3D images comprising left-eye and right-eye views for display, the method comprising:
    based on image data determining amounts to increase pixel values to allow complete subtractive crosstalk cancellation;
    determining a maximum of the amounts;
    globally increasing the pixel values by one or both of addition and scaling in an amount based on the maximum
    wherein determining amounts to increase pixel values comprises computing:

$$R_K(x,y)=\max(0, F(I_{C,K}(x,y))-I_{S,K}(x,y))$$

where $R_k$ is the amount to increase a pixel located at position (x,y), $F()$ is a crosstalk function, $I_{S,K}$ is the value for the color channel K of a pixel in one view of the image, $I_{C,K}$ is the value for the color channel K of a pixel in another view of the image.

3. A method according to claim 2 wherein $F()$ comprises multiplication by a crosstalk factor c.

4. A method for preparing 3D images comprising left-eye and right-eye views for display, the method comprising:
    based on image data determining amounts to increase pixel values to allow complete subtractive crosstalk cancellation;
    determining a maximum of the amounts;
    globally increasing the pixel values by one or both of addition and scaling in an amount based on the maximum
    wherein globally increasing the pixel values comprises globally scaling and/or adding to values in a luminance channel in a color model having separate luminance and chrominance channels and the color model comprises a YCbCr color model.

5. A method for preparing 3D video images comprising left-eye and right-eye views for each of a series of frames for display, the method comprising:
    identifying local areas in a view where pixel values are too small to allow complete subtractive crosstalk cancellation;
    determining intensities for patches of luminance to add to the local areas;
    temporally low-pass filtering the intensities; and
    generating the patches of luminance according to the temporally filtered intensities;
    wherein the patches of luminance ramp up to the temporally filtered intensities in boundary regions surrounding the local areas.

6. A method according to claim 5 comprising, for each of the patches of luminance generating a corresponding patch of luminance for the other view.

7. A method according to claim 6 wherein generating a corresponding patch of luminance comprises locating a center of the patch of luminance, performing block matching to estimate the disparity between the views at a location corresponding to the center of the local area and adding to the other view a copy of the patch of luminance shifted in the x-direction by the estimated disparity.

8. A method according to claim 5 comprising adding a fade out to each patch of luminance in frames subsequent to a last frame for which the patch of luminance is associated.

9. A method according to claim 5 comprising adding a fade in to each patch of luminance in frames prior to a first frame for which the patch of luminance is associated.

10. A method according to claim 7 wherein the block matching is performed with a block size of 16 pixels or more.

11. A method for preparing 3D video images comprising left-eye and right-eye views for each of a series of frames for display, the method comprising:
    identifying local areas in a view where pixel values are too small to allow complete subtractive crosstalk cancellation;
    determining intensities for patches of luminance to add to the local areas;
    linking corresponding local areas across frames of the video images to provide one or more series of linked local areas;
    identifying a first linked local area of one of the series of corresponding linked local areas; and adding fade-in patches of luminance corresponding to the first linked local area to a series of frames preceding the frame corresponding to the first linked local area.

12. A method according to claim 11 comprising identifying a last linked local area in the one of the series of corresponding linked local areas and adding fade-out patches of luminance corresponding to the last linked local area to a series of frames succeeding the frame corresponding to the last linked local area.

13. A non-transitory medium carrying a set of computer-readable signals comprising instructions which, when executed by a data processor, cause the data processor to execute a method for preparing 3D images according to any one of claims 1 to 12.

14. Apparatus for preparing 3D images comprising left-eye and right-eye views for display, the apparatus comprising:
  means for processing image data to determine amounts to increase pixel values to allow complete subtractive crosstalk cancellation;
  means for determining a maximum of the amounts;
  means for globally increasing the pixel values by one or both of addition and scaling in an amount based on the maximum
  wherein the 3D images comprise video frames in a video sequence and the apparatus comprises means for applying a temporal low pass filter to the maximum or an amount derived from the maximum; and
  the temporal filter comprises a bidirectional filter.

15. Apparatus for preparing 3D images comprising left-eye and right-eye views for display, the apparatus comprising:
  means for processing image data to determine amounts to increase pixel values to allow complete subtractive crosstalk cancellation;
  means for determining a maximum of the amounts;
  means for globally increasing the pixel values by one or both of addition and scaling in an amount based on the maximum
  wherein the means for processing image data to determine amounts to increase pixel values is configured to compute:

$$R_K(x,y)=\max(0,F(I_{C,K}(x,y))-I_{S,K}(x,y))$$

where $R_k$ is the amount to increase a pixel located at position (x,y), $F(\ )$ is a crosstalk function, $I_{S,K}$ is the value for the color channel K of a pixel in one view of the image, $I_{C,K}$ is the value for the color channel K of a pixel in another view of the image.

16. Apparatus according to claim 15 wherein $F(\ )$ comprises multiplication by a crosstalk factor c.

17. Apparatus for preparing 3D images comprising left-eye and right-eye views for display, the apparatus comprising:
  means for processing image data to determine amounts to increase pixel values to allow complete subtractive crosstalk cancellation;
  means for determining a maximum of the amounts;
  means for globally increasing the pixel values by one or both of addition and scaling in an amount based on the maximum
  wherein the means for globally increasing the pixel values comprises means for globally scaling and/or adding to values in a luminance channel in a color model having separate luminance and chrominance channels; and the color model comprises a YCbCr color model.

18. Apparatus for preparing 3D video images comprising left-eye and right-eye views for each of a series of frames for display, the apparatus comprising:
  means for identifying local areas in a view where pixel values are too small to allow complete subtractive crosstalk cancellation;
  means for determining intensities for patches of luminance to add to the local areas;
  means for temporally low-pass filtering the intensities; and
  means for generating the patches of luminance according to the temporally filtered intensities.

19. Apparatus according to claim 18 wherein the means for generating the patches of luminance is configured to generate for each of the patches of luminance a corresponding patch of luminance for the other view.

20. Apparatus according to claim 18 comprising means for locating a center of the patch of luminance, means for performing block matching to estimate the disparity between the views at a location corresponding to the center of the patch of luminance and means for adding to the other view a copy of the patch of luminance shifted in the x-direction by the estimated disparity.

21. Apparatus according to claim 18 comprising means for adding a fade out to each patch of luminance in frames subsequent to a last frame for which the patch of luminance is associated.

22. Apparatus according to claim 18 comprising means for adding a fade in to each patch of luminance in frames prior to a first frame for which the patch of luminance is associated.

23. Apparatus for preparing 3D video images comprising left-eye and right-eye views for each of a series of frames for display, the apparatus comprising:
  means for identifying local areas in a view where pixel values are too small to allow complete subtractive crosstalk cancellation;
  means for determining intensities for patches of luminance to add to the local areas;
  means for linking corresponding local areas across frames of the video images to provide one or more series of linked local areas;
  means for identifying a first linked local area of one of the series of corresponding linked local areas; and
  means for adding fade-in patches of luminance corresponding to the first linked local area to a series of frames preceding the frame corresponding to the first linked local area.

24. Apparatus according to claim 23 comprising means for identifying a last linked local area in the one of the series of corresponding linked local areas and adding fade-out patches of luminance corresponding to the last linked local area to a series of frames succeeding the frame corresponding to the last linked local area.

25. Apparatus according to claim 14 provided in a display, a graphics card, a 3D projector, a video player, a media player, or a 3D digital cinema projector.

26. A method for preparing 3D images comprising left-eye and right-eye views for display, the method comprising:
  based on image data determining amounts to increase pixel values to allow complete subtractive crosstalk cancellation;
  determining a maximum of the amounts;
  globally increasing the pixel values by one or both of addition and scaling in an amount based on the maximum
  wherein globally increasing the pixel values comprises globally scaling and/or adding to values in a luminance channel in a color model having separate luminance and chrominance channels.

* * * * *